United States Patent [19]

Takagi

[11] Patent Number: 5,548,509
[45] Date of Patent: Aug. 20, 1996

[54] RECORDING MEDIUM AND INFORMATION READING APPARATUS

[75] Inventor: Koji Takagi, Kanagawa, Japan

[73] Assignee: Sony Corporation, Tokyo, Japan

[21] Appl. No.: 359,012

[22] Filed: Dec. 19, 1994

Related U.S. Application Data

[63] Continuation of Ser. No. 930,014, Aug. 13, 1992.

[30] Foreign Application Priority Data

Aug. 20, 1991 [JP] Japan .................................. 3-232150

[51] Int. Cl.⁶ .................................................. G06F 17/30
[52] U.S. Cl. .......................... 364/419.16; 369/58; 369/54
[58] Field of Search ...................... 364/419.16; 395/155, 395/156; 369/54, 58, 47, 48, 50

[56] References Cited

U.S. PATENT DOCUMENTS

| | | | |
|---|---|---|---|
| 4,365,315 | 12/1982 | Jamnik | 364/DIG. 2 |
| 4,456,969 | 6/1984 | Herzik et al. | 364/DIG. 2 |
| 4,566,078 | 1/1986 | Crabtree | 364/DIG. 2 |
| 4,595,980 | 6/1986 | Innes | 364/DIG. 1 |
| 4,615,002 | 9/1986 | Innes | 364/DIG. 1 |
| 4,731,735 | 3/1988 | Borgendale et al. | 364/DIG. 1 |
| 5,009,276 | 4/1991 | Raikes et al. | 364/464.02 X |
| 5,014,301 | 5/1991 | Maltezos | 379/155 |
| 5,063,522 | 11/1991 | Winters | 395/51 |
| 5,155,849 | 10/1992 | Westfall et al. | 395/600 |

FOREIGN PATENT DOCUMENTS

| | | | |
|---|---|---|---|
| 0217174A3 | 4/1987 | European Pat. Off. | G06F 15/20 |
| 0388148A2 | 9/1990 | European Pat. Off. | G06F 15/38 |
| 0437093A2 | 7/1991 | European Pat. Off. | G06F 15/40 |

OTHER PUBLICATIONS

Peter Norton's DOS Guide, by Peter Norton, Simon & Schuster, Inc., New York, NY, 1984, pp. 110–112.
Patent Abstracts of Japan, vol. 10, No. 361 (P–523), 4 Dec. 1986 & JP–A–61 157 919 (Canon Inc.), 17 Jul. 1986.

*Primary Examiner*—Gail O. Hayes
*Assistant Examiner*—Krishna Kalidindi
*Attorney, Agent, or Firm*—Limbach & Limbach L.L.P.

[57] ABSTRACT

A recording medium contains operation descriptions for information reading apparatus, where such operating descriptions are recorded in multiple languages. When a CD-ROM, as the recording medium, is loaded into an information reading apparatus and the language for display is selected by the user, a CPU retrieves operating descriptions of the information reading apparatus expressed in the selected language for display from the CD-ROM and stores them into a main RAM. Thereafter, according to the operations made by the user, applicable sentences of the operating descriptions of the information reading apparatus, expressed in the selected language, are displayed on a display by the CPU.

12 Claims, 6 Drawing Sheets

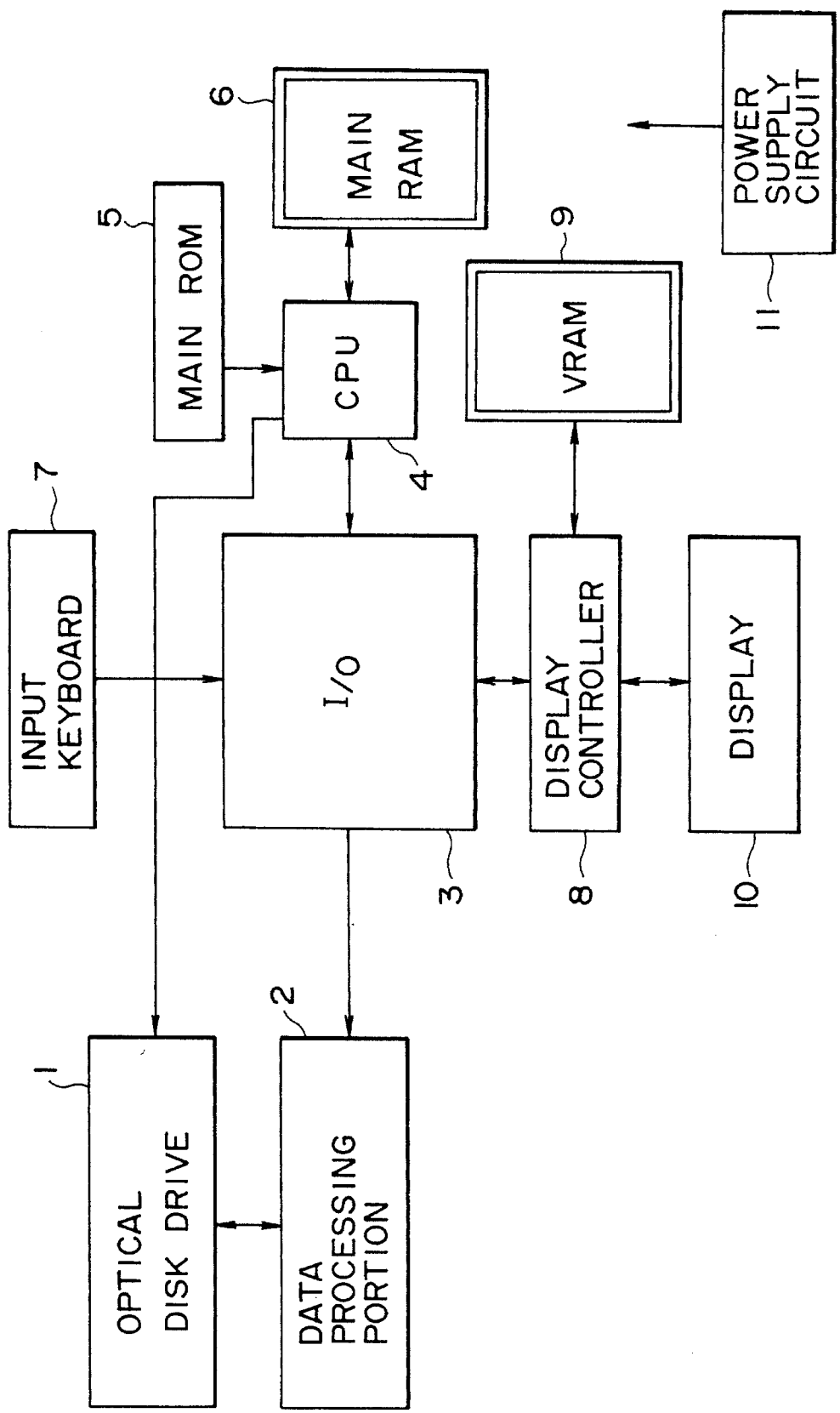

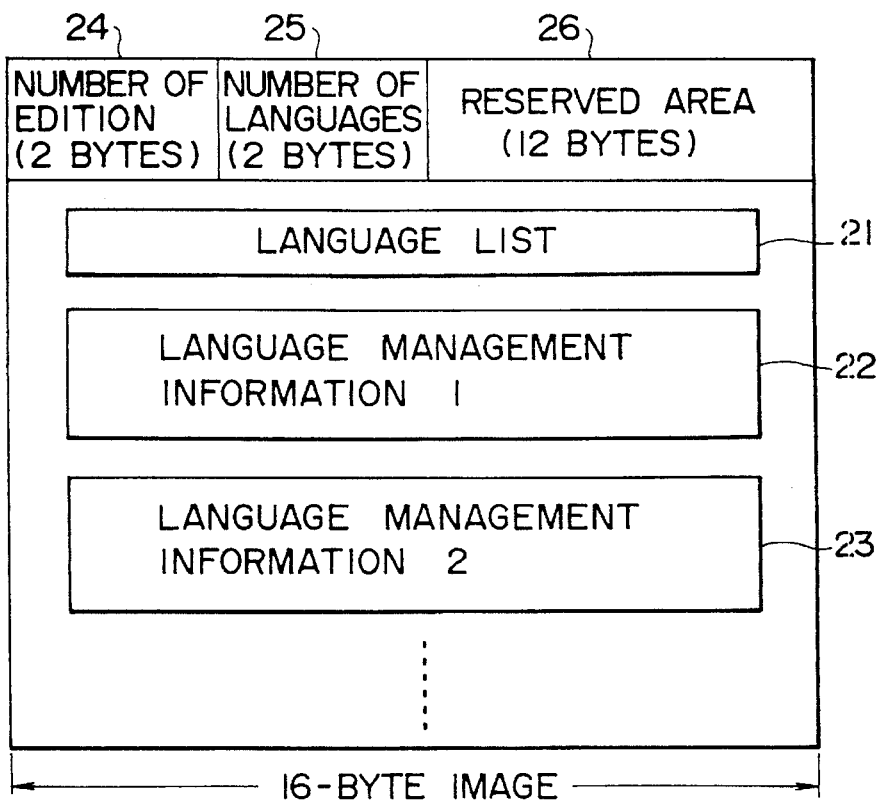

FIG. 4

| CLASSIFICATION | CODE | EXPRESSION IN ENGLISH | CORRESPONDING EXPRESSION IN JAPANESE |
|---|---|---|---|
| NAME OF SEARCH | 00h : | Word Search (20) | Tango kensaku (Zenpoh icchi) |
| | 01h : | Endword Search (20) | Tango kensaku (Kohoh icchi) |
| | 02h : | Keyword Search (20) | Johken kensaku |
| | 03h : | Menu Search (20) | Menu kensaku |
| | 04h : | Multi-Search (20) | Fukugo kensaku |
| | 05h : | Graphic Search (20) | Graphic kensaku |
| DISPLAY OF MESSAGE | 20h : | This Electronic Book contains : (30) | Kono Denshi Book wa |
| | 21h : | Enter the word (30) | Kensakugo wo nyuryoku shitekudasai |
| | 22h : | Enter the words (30) | Kensakugo wo nyuryoku shitekudasai |
| | 23h : | Successful (17) | Gaitoh koumoku ichiran |
| | 24h : | entry (10) | Ken |
| | 25h : | entries (10) | Ken |
| | 26h : | Search unsuccessful (30) | Gaitoh koumoku ga arimasen |
| | 27h : | Push the F4 key (30) | Fukki wo oshite kudasai |
| | 28h : | Please insert the disc (30) | Disc wo irete kudasai |
| | 29h : | Cannot read the disc (30) | Disc ga yomemasen |
| | 2Ah : | Re-insert the disc (27) | Disc wo irenaoshite kudasai |
| | 2Bh : | Clean the disc (27) | Disc wo nuite kudasai |
| | 2Ch : | The disc inserted is not an EB(30) | Disc ga kikakugai desu |
| | 2Dh : | Searching...... (30) | Tadaima, kensakuchu desu |
| | 2Eh : | Now charging the battery (30) | Genzai, judenchu desu |
| | 2Fh : | (except for dry battery) (30) | Chui, kandenchi wa juden dekimasen |
| | 30h : | Charge complete (30) | Juden ga kanryo shimashita |
| | 31h : | The battery is empty (30) | Denchi ga shoumou shiteimasu |
| | 32h : | Battery charge (20) | Denchi zanryo |
| | 33h : | Cannot charge the battery (30) | Juden dekimasen |
| | 34h : | Select menu language (30) | Hyoji gengo wo erande kudasai |
| | 35h : | MENU (10) | Mokuji |

FIG. 6(C)
FIG. 6(B)
DISPLAY SCREEN FOR LANGUAGE SELECTION
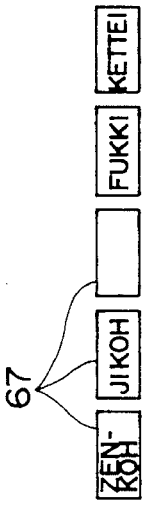
FIG. 6(A)
DISPLAY SCREEN FOR REFERENCE SELECTION
FIG. 6(F)
FIG. 6(E)
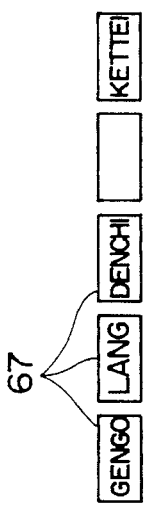
FIG. 6(D)
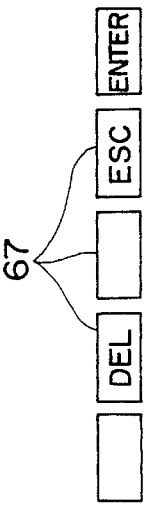
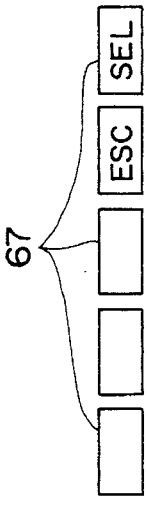

RECORDING MEDIUM AND INFORMATION READING APPARATUS

This is a continuation of co-pending application Ser. No. 07/930,014 filed on Aug. 13, 1992.

BACKGROUND OF THE INVENTION

1. Filed of the Invention

The present invention relates to an information reading apparatus and to a recording medium in which operating descriptions of an information reading apparatus are recorded in multiple languages and the information reading apparatus.

2. Description of the Related Art

So far, in an information reading apparatus for reading and displaying recorded information, information such as operating procedure and description of the information reading apparatus (hereinafter referred to as operating descriptions), together with operation programs for operating the apparatus, is stored in a main ROM within the apparatus. Hence, in the image reading apparatus, it is generally arranged such that operating descriptions are displayed only in one language of the country in which the information reading apparatus is used. Therefore, every time when the destination of the apparatus is changed, it has been necessary to change the contents of the main ROM so that they are adapted for use in the language of the country of destination. Accordingly, the same product of the conventional image reading apparatus has been unable to be used in all countries of the world but has to have its specifications changed for every place of destination.

However, with the conventional information reading apparatus as described above, it has been necessary to change the specifications so that they are adapted for use in each language of the place of destination and it has been impossible to make one product applicable to all places of the world and, accordingly, an increase in cost has been unavoidable.

SUMMARY OF THE INVENTION

An object of the present invention is to provide a recording medium which enables the provision of an information reading apparatus having excellent operability and low in cost by being adapted such that the same product of the apparatus is applicable to all places of the world.

Another object of the present invention is to provide an information reading apparatus which displays operating descriptions of the information reading apparatus in the language for display selected by the user, so that the same product of the apparatus is applicable to all parts of the world, and hence excellent in operability and low in cost.

BRIEF DESCRIPTION OF THE DRAWINGS

FIG. 1 is a block diagram showing an embodiment of the information reading apparatus according to the present invention;

FIG. 2 is a diagram showing an example of arrangement of the registered language management file (LANGUAGE);

FIG. 3 is a diagram showing an example of arrangement of the language list 21 in FIG. 2;

FIG. 4 is a diagram showing a statement identification code list included in the language management information ① 22 in FIG. 2;

FIG. 6 (A) through 6(F) show diagrams of examples of display screens expressed in English.

DESCRIPTION OF THE PREFERRED EMBODIMENTS

Figure 5:
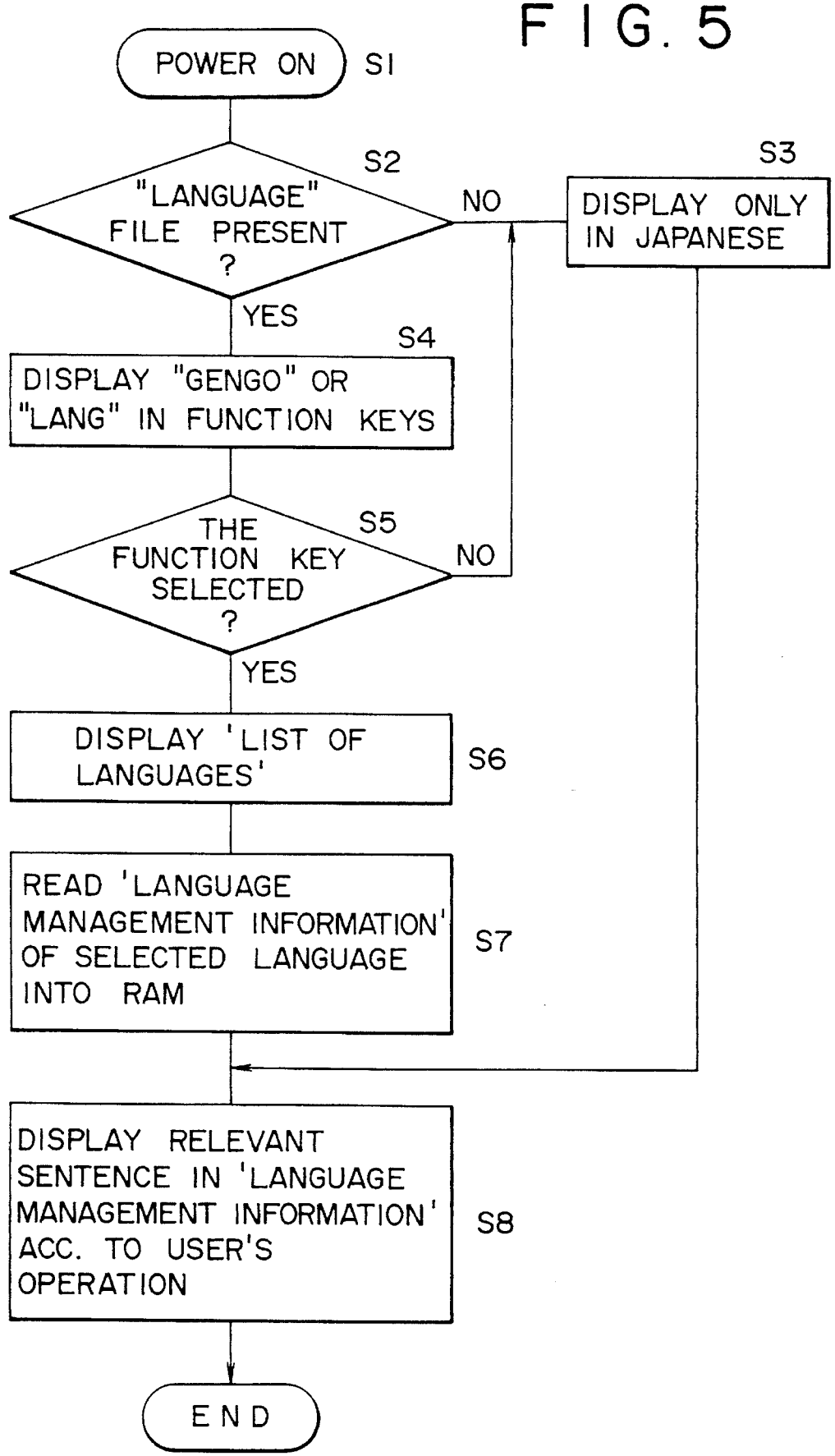
FIG. 5 is an operational flow chart of the information reading apparatus according to the present invention.

An embodiment of the present invention will now be described below with reference to the accompanying drawings.

FIG. 1 is a block diagram showing an embodiment of the information reading apparatus according to the present invention. Referring to FIG. 1, reference numeral 1 denotes an optical disk drive. The optical disk drive 1 is a drive for a CD-ROM as the recording medium loaded in the apparatus. Of the CD-ROM used here, there are two kinds, a CD-ROM in which operating descriptions of the information reading apparatus are recorded in Japanese (hereinafter called CD-ROM (1)) and a CD-ROM in which operating descriptions of the information reading apparatus are recorded in predetermined multiple languages (hereinafter called CD-ROM (2)). For the latter CD-ROM (2), there is provided a registered language management file (LANGUAGE).

Reference numeral 2 denotes a data processing portion for operating the optical disk drive 1 under instructions from a CPU 4 and supplying data from the CD-ROM to the CPU 4 through an input/output unit 3 (hereinafter called I/O). Reference numeral 5 denotes a main ROM storing various operation programs for operating the information reading apparatus and specifically adapted to support the CD-ROM in any of the multiple languages. Reference numeral 6 denotes a main RAM for storing data temporarily. The ROM 5 and the RAM 6 are connected with the CPU 4. Reference numeral 7 denotes an input keyboard for the user and this input keyboard 7 is connected with the CPU 4 through the I/O 3. Reference numeral 8 denotes a display controller connected with the CPU 4 through the I/O 3. This display controller 8, under the control of the CPU 4, controls such that the contents to be displayed from the CPU 4 are temporarily stored into a video RAM (hereinafter called VRAM) and then displayed on a display 10.

The CD-ROM (2) will now be described below.

The registered language management file (LANGUAGE) provided (recorded) in the CD-ROM (2) is prepared to make clear the relationships between each of names related to the searching operation performed by the information reading apparatus and the corresponding name expressed in each language. The location on the disk of the registered language management file (LANGUAGE) within the CD-ROM (2) is arranged as follows a root directory is provided as a low-order structure of the volume descriptor, and the root directory is formed of various directories "LANGUAGE", "FILE ①", "FILE ②", "FILE ③", . . . . The file name of "FILE ①" is "START (reference file)".

The registered language management file (LANGUAGE) is structured, as shown in FIG. 2, as a collection of a language list 21 showing a list (kinds) of languages capable of being displayed and sets of language management information 22, 23, . . . corresponding to the contents displayed in each language of the languages included in the language list 21. Referring to FIG. 2, the language management information 122 corresponds to the contents to be displayed in relation to operating descriptions given, for example, in English, while the language management information 2 23 corresponds to the contents to be displayed in relation to operating descriptions given in French. Reference numeral 24 denotes the number of edition (2 bytes), i.e., indicates the version of the registered language management file. The present number of version is 1 (binary). Reference numeral 25 denotes the number of languages (2 bytes), i.e., the number of languages (binary) controlled in the registered language management file. Reference numeral 26 denotes a reserved area.

The language list 21 is arranged as shown in FIG. 3. Referring to FIG. 3, reference numeral 31 denotes a language number and 32 denotes a language name. The language number (1 byte) and the language name (fixed length of 15 bytes) are set for each language, and the data corresponding to the number of languages are sequentially arranged as shown in FIG. 3. The language numbers are arranged in binary values and has 00h as the reference point. The language numbers 00h to 05h are used as shown in FIG. 3 and other languages are treated as options and assigned to the numbers from the language number 06h on. The language names are all expressed in English. An international standard code, "ISO 8859," is used as the character code.

Each set of language management information 22, 23, ... of the registered language management file (LANGUAGE) includes a statement identification code table expressed in the language put on the language list 21. Therefore, the language management information 122 provides the contents to be displayed in English and, hence, the statement identification code table included therein is also expressed in English as shown in FIG. 4. Referring to FIG. 4, the number in ( ) indicates the maximum number of characters and "ISO 8859" or "SHIFT JIS code" is used as the character code. In the table of FIG. 4, statements related to the operating descriptions of the information reading apparatus corresponding to the statement identification codes in English are arranged to correspond to those in Japanese.

Operation will now be described below with reference to the flow chart of FIG. 5. FIG. 5 is an operational flow chart of the information reading apparatus according to the present invention. FIG. 6 is a diagram showing an example of display screen expressed in English and FIG. 7 is a diagram showing an example of a display screen expressed in Japanese. In all cases other than for display screens expressed in Japanese, the function keys 67 on the bottom line of the display screens 61 to 66 and 71 to 73 in FIG. 6 and FIG. 7 are given in English. Provided below is a description for the case where Japanese is specified as the normally set language (default).

First, after loading a CD-ROM into the information reading apparatus of the arrangement as shown in FIG. 1, the power supply circuit 11 is turned on to supply power to the apparatus (step S1). The CPU 4, when the power is turned on, fetches the operation program from the main ROM 5 and stores it into the main RAM 6. Then, the CPU 4, according to the operation program stored in the main RAM 6, causes, through the I/O 3 and the display controller 8, the display 10 to display thereon a screen for reference selection as shown in FIG. 6(A) as the display screen 61. The CPU 4, immediately after the power has been turned on, accesses a specified place in the CD-ROM, through the I/O 3, the data processing portion 2, and the optical disk drive 1, and checks whether or not there is present the "LANGUAGE" file (step S2).

Figure 7A:
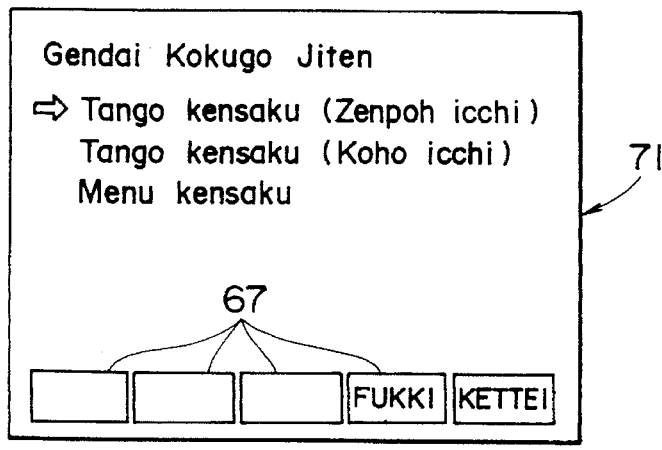
FIG. 7(A) through 7(C) show diagrams of examples of display screens expressed in Japanese.

In this case, a "LANGUAGE" file is not present in the CD-ROM, this CD-ROM is found to be the CD-ROM (1) and, hence, the CPU 4 fetches the language management information (the operating descriptions of the information reading apparatus in Japanese) from the CD-ROM (1) and stores it into the main RAM 6. Then, the CPU 4 causes the display 10 to display thereon the operating descriptions of the information reading apparatus, the operating descriptions being expressed only in Japanese (step S3). Therefore, according to the user's operation on the input keyboard 7, the CPU 4 retrieves the relative sentences of the operating descriptions in Japanese of the language management information from the main RAM and causes the display 10 to display them on it (step S8). For example, when "Kettei" ("Kettei" is the Japanese word for "Select") of the function keys on the display screen 61 df FIG. 6(A) is selected with the keyboard 7, the CPU 4 causes the display 10 to display thereon the display screen 71 as shown in FIG. 7(A). When the user brings an arrow-head cursor to the position of "Word Search (Front-word search)" on the display screen 71 and selects "Kettei" of the function keys 67, the CPU 4 causes the display 10 to display thereon a display screen 72 shown in FIG. 7(B). Further, when the user inputs the word to be searched in the specified position in the display screen 72 using the input keyboard 7 and selects "Search" of the function keys 67, the CPU 4 causes the display 10 to display thereon a display screen 73 shown in FIG. 7(C).

When the "LANGUAGE" file is present in the CD-ROM in the step S2, the CD-ROM is found to be the CD-ROM (2) and, hence, the CPU 4 causes the display 10 to display "Gengo" ("Gengo" is the Japanese word for "language") or "LANG" ("LANG" stands for "language") as the function key 67 at the function display portion in the display screen 61, to inform the user of the fact that the optical disk, i.e., the CD-ROM (2), is multilingual (adapted to multiple languages) (step S4).

Then, the CPU 4 checks whether or not "Gento" or "LANG" of the function keys 67 has been selected by the user (step S5); and if it has not been selected, the CPU 4 retrives the contents of the language management information 122, i.e., the contents to be displayed in relation to the operating descriptions of the information reading apparatus in Japanese, from the CD-ROM (2) and stores it into the main RAM 6. If the user makes the same operation as described above using the input keyboard 7, then the CPU 4, according to the user's operation, reads sentences related to the operating descriptions of the information reading apparatus in Japanese of the language management information 122 from the main RAM 6, and causes the display 10 to display them on the display screens 71 to 73 shown in FIGS. 7(A) to 7(C) as described above (steps S3 and S8).

When either "Gengo" or "LANG" of the function keys 67 has been selected by the user, the CPU 4 retrieves the language list 21 of the "LANGUAGE" file from the CD-ROM (2) and stores it into the main RAM 6. The CPU 4, according to the language list 21 stored in the main RAM 6, causes the display 10 to display a list of languages on the display screen 62 shown in FIG. 6(B), i.e., on a screen for language selection (step S6).

Then, if the user brings the arrow-head cursor to the position indicating the language for display selected from the list of languages for display, for example "English" in this case, on the display screen 62 shown in FIG. 6(B) using the input keyboard 7 and selects "Kettei" of the function keys 67, the CPU 4 reads the language management information of the selected language for display, i.e., the language management information 122 in this case, and stores it into the main RAM 6 (step S7). Then, if the user operates in accordance with the operating instructions on the display screen of the display 10 using the input keyboard 7, the CPU 4, in accordance with input from the user, causes the display 10 to display, in the display screen thereon, sentences (given in English) related to the operating descriptions of the information reading apparatus in the language management information 122 stored in the main RAM 6 (step S8).

Figure 7B:
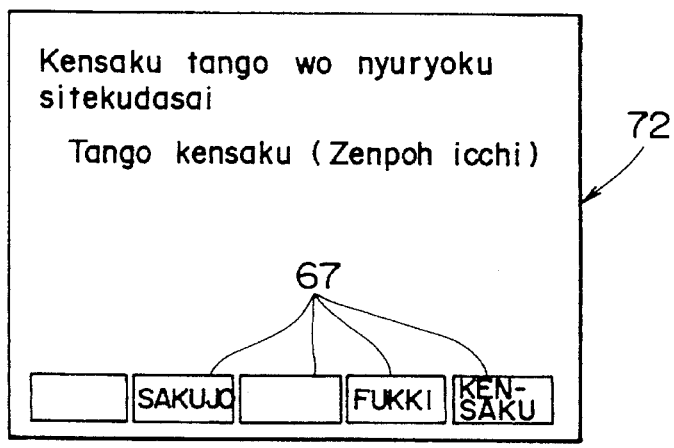
Figure 7C:
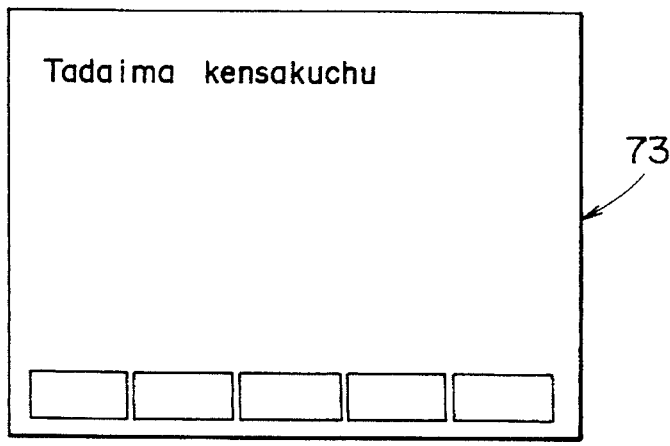

For example, when the user selects "English" on the display screen 62 shown in FIG. 6(B) as described above, the CPU 4 causes the display 10 to display a display screen 63 (a screen for reference selection) shown in FIG. 6(C). Then, if the user brings the arrow-head cursor to the position indicating "Modern Dictionary of Japanese" (which means "Gendai Kokugo Jiten" in Japanese) on the display screen 63 using the input keyboard 7 and selects "SEL" ("SEL" stands for "select") of the function keys 67, the CPU 4 reads, from the main RAM 6, sentences related to the operating descriptions of the information reading apparatus in the language management information and causes the display 10 to display them in the display screen 64 as shown in FIG. 6(D). This display screen 64 is equivalent to the display screen 71 as shown in FIG. 7(A). When the user brings the arrow-head cursor to the position indicating "Word Search" on the display screen 64 using the keyboard 7 and selects "SEL" using the function keys 67, the CPU 4 reads sentences related to the operating descriptions of the information reading apparatus in the language management information from the main RAM 6 and causes the display 10 to display them on the display screen 65 as shown in FIG. 6(E). This display screen 65 is equivalent to the display screen 72 as shown in FIG. 7(B). If, then, the user inputs the word to be searched in Japanese in a specified position on the display screen 65 according to the indication "Enter the word" and selects "ENTER" from the function keys 67, the CPU 4 reads the sentence related to the operating descriptions of the information reading apparatus in the language management information from the main RAM 6, i.e., "Searching" in the present case, and causes the display 10 to display it on the display screen 66 as shown in FIG. 6(F). This display screen 66 is equivalent to the display screen 73 as shown in FIG. 7(C).

Thereafter, in the same way as described above, the CPU 4 causes the display 10 to make relevant displays.

Incidentally, the displayed sentences in English in the display screens 63 to 66 shown in FIG. 6(C) to FIG. 6(F) of the display 10 are read out by the CPU 4 from a statement identification code table as shown in FIG. 4 within the language management information 122 stored in the main RAM 6.

As apparent from the description given above, there are some operation programs adapted for use in predetermined multiple languages stored in the main 5. Furthermore and further, there are operating descriptions of the information reading apparatus recorded in the predetermined multiple languages recorded in the CD-ROM (2). Accordingly, when actually operating the apparatus, the user need not have the information reading apparatus whose specifications are changed according to the destination thereof, but can select a language for display (for example, his own language) from the predetermined multiple languages and have the relative sentences of the operating descriptions of the information reading apparatus displayed on the display 10 expressed in the selected language for display. Thus, without having a language barrier, anybody in the world can use the information reading apparatus of the same specifications and operate the information reading apparatus well. Accordingly, the operability of the information reading apparatus is greatly improved. Further, the same products of the information reading apparatus and CD-ROM (2) can be universally used in all parts of the world. Therefore, the information reading apparatus can be produced at lower cost than before.

According to the present invention, meritorious effects as follows can be obtained.

(1) There are operating descriptions of the information reading apparatus expressed in predetermined multiple languages recorded in the recording medium and there are some operation programs adapted for use with predetermined multiple languages stored in the memory within the information reading apparatus. Accordingly, by loading the recording medium into the information reading apparatus, applicable operating descriptions of the information reading apparatus in the language for display selected by the user are read from the recording medium and the operating descriptions of the information reading apparatus according to the operation made the user are displayed on the display. Thus, without having a language barrier, anybody in the world can use the information reading apparatus of the same specifications and operate the information reading apparatus well. Accordingly, the operability of the information reading apparatus is greatly improved.

(2) As apparent from (1) above, the need for changing the specifications of the information reading apparatus according to its destination can be eliminated and the information reading apparatus and the recording medium of the same specifications can be used as such in all parts of the world. Therefore, it becomes possible to produce the information reading apparatus at lower cost than before.

The present invention is not limited to the above described embodiment but various modifications and variations can be made without departing from the spirit of the present invention.

What is claimed is:

1. An apparatus for reading and displaying information recorded on a removable optical disc, comprising:

operation means for selecting information of operating descriptions expressed in a specified language from information of operating descriptions expressed in multiple languages;

reading means for reading information recorded on a removable optical disc;

first memory means for storing therein the information of operating descriptions;

display means for displaying thereon the information of operating descriptions stored in the first memory means;

second memory means for storing therein operation programs for reading from said first memory means the information of operating descriptions;

control means for controlling the display means and for determining upon loading of the removable optical disc into the reading means and energization of the apparatus for reading and displaying whether the information of operating descriptions expressed in multiple languages is recorded on the removable optical disc, and when the information of operating descriptions expressed in multiple languages is recorded, to display on the display means an indication that the operating descriptions expressed in multiple languages are available, and when the information of operating descriptions expressed in multiple languages is not recorded on the removable optical disc, to display on the display means operating descriptions expressed in a single preselected language.

2. An information reading apparatus according to claim 1, wherein said control means further comprises:

means for causing said display means to display thereon a table of languages to permit a selection of a language in response to input from a user to display the table of languages.

3. An information reading apparatus according to claim 1, wherein the control means determines that the information of operating descriptions expressed in multiple languages is recorded on the optical disc by reading a root directory of the optical disc, said root directory located under a volume descriptor and determines if the root directory includes a registered language management file which has operating descriptions expressed in multiple languages.

4. An apparatus according to claim 3, and further including:

input means, wherein, in addition to being for controlling the display means and for determining upon loading of the removable optical disc into the reading means and energization of the apparatus for reading and displaying whether the root directory includes the registered language management file, the control means is further for controlling the display means and for determining, in response to user input data entered via the input means, whether the root directory includes the registered language management file.

5. An apparatus according to claim 4, wherein the control means is further for causing the display means to display a result of the determination.

6. A reproducing apparatus, comprising:

an optical disc on which a plurality of files are recorded in a root directory under a volume descriptor, said root directory including a registered language management file containing operating descriptions expressed in multiple languages;

reading means for reading data from said optical disc;

display means for displaying information of operating descriptions for referring to data on said optical disc;

storing means for storing said registered language management file read out from said optical disc by said reading means; and control means for controlling each operation of said reading means, said storing means and said display means, said control means discriminating a kind of said optical disc according to a determination of whether said registered language management file is recorded on said optical disc and controlling said display means for displaying the information of operating descriptions according to the result of the discrimination, wherein the information of operating descriptions is expressed in a preselected language by said control means when said registered language management file is not recorded on said optical disc, and wherein the information of the operation description expressed in the multiple languages is displayed on said display means by said control means when said registered language management file is recorded on said optical disc.

7. A reproducing apparatus according to claim 6, display means is controlled to display an indication that said optical disc has said registered language management file.

8. A reproducing apparatus according to claim 7, wherein said recording apparatus further comprises input means, operable by a user, wherein said control means controls according to input data from said input means.

9. A reproducing apparatus according to claim 8, wherein said control means controls said display means to display operation descriptions in the multiple languages when said input means is operated according to the information which shows said optical disc having said registered language management file displayed on said display means.

10. A reproducing apparatus, comprising:

a CD-ROM format optical disc on which a plurality of files are recorded in a root directory under a volume descriptor, said root directory including a registered language management file containing operating descriptions expressed in multiple languages;

reading means for reading data from said optical disc;

display means for displaying information of operating descriptions for referring to data on said optical disc and at least one function key;

storing means for storing said registered language management file read out from said optical disc by said reading means;

input means operable by a user; and control means for controlling each operation of said reading means, said storing means and said display means according to input data from said input means, said control means discriminating a kind of said optical disc according to the result of whether said registered language management file is recorded on said optical disc and controlling said display means for displaying the information of operating descriptions according to the result of the discrimination, wherein the information of operating descriptions is expressed in a preselected language by said control means when said registered language management file is not recorded on said optical disc, and wherein the information of the operating description expressed in the multiple languages is displayed on said display means by said control means when said registered language management file is recorded on said optical disc.

11. A reproducing apparatus according to claim 10, wherein said display means is controlled to display a selecting function key which is usable to select a language of the operating descriptions according to the discriminating result of said control means.

12. A reproducing apparatus according to claim 11, wherein said display means displays a list of languages read out from said storing means when said selecting function key is selected by said input means.

* * * * *